US009687809B2

(12) United States Patent
Sakakibara et al.

(10) Patent No.: US 9,687,809 B2
(45) Date of Patent: Jun. 27, 2017

(54) SMALL REACTOR AND REACTION DEVICE

(71) Applicant: Dexerials Corporation, Shinagawa-ku, Tokyo (JP)

(72) Inventors: Shigeshi Sakakibara, Tokyo (JP); Akio Takada, Tokyo (JP); Shintaro Futakami, Tokyo (JP); Nobuyuki Koike, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 3 days.

(21) Appl. No.: 14/865,054

(22) Filed: Sep. 25, 2015

(65) Prior Publication Data

US 2016/0089652 A1 Mar. 31, 2016

(30) Foreign Application Priority Data

Sep. 30, 2014 (JP) ................................. 2014-200567

(51) Int. Cl.
*B01J 19/00* (2006.01)
*B01J 19/12* (2006.01)
*B01J 19/24* (2006.01)

(52) U.S. Cl.
CPC ......... *B01J 19/0093* (2013.01); *B01J 19/123* (2013.01); *B01J 19/24* (2013.01); *B01J 19/249* (2013.01); *B01J 2219/0086* (2013.01); *B01J 2219/00786* (2013.01); *B01J 2219/00801* (2013.01); *B01J 2219/00831* (2013.01); *B01J 2219/00903* (2013.01); *B01J 2219/00936* (2013.01); *B01J 2219/0209* (2013.01); *B01J 2219/0884* (2013.01); *B01J 2219/0888* (2013.01); *B01J 2219/2458* (2013.01); *B01J 2219/2488* (2013.01); *B01J 2219/2497* (2013.01)

(58) Field of Classification Search
CPC ...... B01J 2219/00831; B01J 2219/0209; B01J 2219/2488; B01J 2219/2458; B01J 2219/2455; B01J 2219/2456; B01J 2219/2497; B01J 2219/00801; B01J 2219/00804; B01J 2219/0086; B01J 2219/00903; B01J 2219/00936; B01J 2219/0254; B01J 2219/0888; B01J 2219/0884; B01J 2219/00786; B01J 2219/00799; B01J 19/0093; B01J 19/123; B01J 19/249; B01J 19/24
See application file for complete search history.

(56) References Cited

U.S. PATENT DOCUMENTS

2004/0170538 A1* 9/2004 Kawakami ............. B01J 19/123
422/128
2013/0121889 A1* 5/2013 Usami .................... B01J 21/063
422/186.3

FOREIGN PATENT DOCUMENTS

JP 2009-125735 A 6/2009

* cited by examiner

*Primary Examiner* — Lessanework Seifu
(74) *Attorney, Agent, or Firm* — Buchanan, Ingersoll & Rooney PC

(57) ABSTRACT

A small reactor, which contains an inorganic transparent substrate, which contains: a reaction channel configured to allow a chemical reaction to proceed therein; a supply channel, which is connected to one end of the reaction channel, and is configured to supply samples to be reacted in the reaction channel; and a discharge channel, which is connected to the other end of the reaction channel, and is configured to discharge a reaction product from the reaction channel, wherein the inorganic transparent substrate is in the shape of an arc-shaped curve.

16 Claims, 6 Drawing Sheets

SMALL REACTOR AND REACTION DEVICE

BACKGROUND OF THE INVENTION

Field of the Invention

The present invention relates to a small reactor, and a reaction device.

Description of the Related Art

Conventionally, most of glass reactors, which are small reactors, have flat-plate shapes, as they are formed with a substrate where substrates, to flat surfaces of which groves are formed, are bonded (adhered, welded, or pressure bonded), or a substrate to one side of which a groove is formed is bonded (adhered, welded, or pressure bonded) with cover glass (for example, Japanese Patent Application Laid-Open (JP-A) No. 2009-125735).

There is no problem with a flat plate-shaped reactor, when the flat plate-shaped reactor is used for blending a material A and a material B. In the case where a photochemical reaction is performed, for example, it is necessary to uniformly apply light (distance from a light source, illuminance, light intensity) over a surface of the reactor to uniformly allow the reaction to proceed.

To this end, a system for making light even, such as a light-guiding plate, a reflector, and the Fresnel lens, is required when a spherical or cylindrical light source, such as a mercury lamp, is used as a light source. In the case where a semiconductor light source, such as LED, is used, moreover, large numbers of LEDs are arranged on a surface to make light uniform. If these methods are not used, unevenness in illuminance of light is observed in a reactor due to light, which is generally radially applied from a light source. Therefore, problems may occur, such as instability of a reaction (increase in temperature, explosive boiling), under or over reaction, and an increased by-product.

SUMMARY OF THE INVENTION

The present invention aims to solve the aforementioned various problems in the art, and achieve the following object. Specifically, the object of the present invention is to provide a small reactor, which can be used in a device that is inexpensive and has a simple structure, and can carry out a photochemical reaction stably and efficiently.

The means for solving the aforementioned problems are as follows:

<1> A small reactor, containing:
an inorganic transparent substrate, which contains:
a reaction channel configured to allow a chemical reaction to proceed therein;
a supply channel, which is connected to one end of the reaction channel, and is configured to supply samples to be reacted in the reaction channel; and
a discharge channel, which is connected to the other end of the reaction channel, and is configured to discharge a reaction product from the reaction channel,
wherein the inorganic transparent substrate is in the shape of an arc-shaped curve.
<2> The small reactor according to <1>, wherein the inorganic transparent substrate is composed of a first inorganic transparent substrate in a surface of which a groove to be the reaction channel is formed, and a second inorganic transparent substrate provided to the side of the surface of the first inorganic transparent substrate where the groove is formed, where the first inorganic transparent substrate and the second inorganic transparent substrate are joined with joint surfaces formed at surfaces thereof, and
wherein the first inorganic transparent substrate and the second inorganic transparent substrate are chemically bonded and integrated to form the inorganic transparent substrate after joined at the joint surfaces.
<3> The small reactor according to <1> or <2>, wherein the inorganic transparent substrate is a glass substrate.
<4> The small reactor according to any one of <1> to <3>, wherein the reaction channel is formed into a multi-layered structure along a thickness direction of the inorganic transparent substrate.
<5> The small reactor according to <4>, wherein the inorganic transparent substrate further contains an interlayer connection channel configured to connect the reaction channels in different layers.
<6> The small reactor according to <4> or <5>, wherein the multi-layered reaction channel has two or more structures being different from each other.
<7> The small reactor according to any one of <4> to <6>, wherein a heating function, a cooling function, or both are imparted by introducing a heat medium into the reaction channel of at least one layer.
<8> The small reactor according to any one of <4> to <7>, wherein the reaction channel is a multi-layered reaction channel, and the inorganic transparent substrate is formed by laminating two or more different types of glass substrates.
<9> A reaction device, containing:
a plurality of small reactors, reaction channels of which are connected,
wherein at least one of the small reactors is the small reactor according to any one of <1> to <8>.
<10> A reaction device, containing:
the small reactor according to any one of <1> to <8>; and
a light source configured to apply light to allow a chemical reaction to proceed in the reaction channel.
<11> The reaction device according to <10>, wherein the light source is provided at a concave surface side of the inorganic transparent substrate.
<12> The reaction device according to <10> or <11>, wherein the small reactor is provided in a manner that the reaction channel is placed at a position where an arc is formed on a circumference with the light source being a center.
<13> The reaction device according to any one of <10> to <12>, wherein an optical lens having a converge function is provided at a surface of the small reactor, which is at a side where the light source is provided.
<14> The reaction device according to <13>, wherein a light reflective plate is provided at a surface of the small reactor, which is an opposite side to the side where the light source is provided.

The present invention can solve the aforementioned various problems in the art, can achieve the aforementioned object, and can provide a small reactor, which can be used in a device that is inexpensive and has a simple structure, and can carry out a photochemical reaction stably and efficiently.

DETAILED DESCRIPTION OF THE INVENTION (Small Reactor)

The small reactor of the present invention contains an inorganic transparent substrate, which contains: a reaction channel configured to allow a chemical reaction to proceed therein; a supply channel, which is connected to one end of the reaction channel, and is configured to supply samples to be reacted in the reaction channel; and a discharge channel, which is connected to the other end of the reaction channel, and is configured to discharge a reaction product from the reaction channel, wherein the inorganic transparent substrate is in the shape of an arc-shaped curve.

The small reactor of the present invention is used as a production container, which induces a chemical reaction at an interface between a gas phase and a liquid phase, or an interface between a liquid phase and a liquid phase, to produce a reaction product.

<Reaction Channel>

The reaction channel is a channel formed for carrying out a chemical reaction at a gas-liquid interface, or a liquid-liquid interface. The chemical reaction progresses in the reaction channel.

As for the reaction channel, a fine channel formed by ultrafine processing is provided within the inorganic transparent substrate.

A structure of the small reactor is explained with reference to drawings hereinafter. Note that, the small reactor of the present invention is in the shape of an arc-shaped curve, but a structure of the small reactor is explained with reference to a schematic diagram of a flat plate-shaped small reactor before formed into a curve, as it is easier to explain the structure inside the inorganic transparent substrate, such as the reaction channel than using a diagram where a shape of the small reactor is curved.

Figure 3:
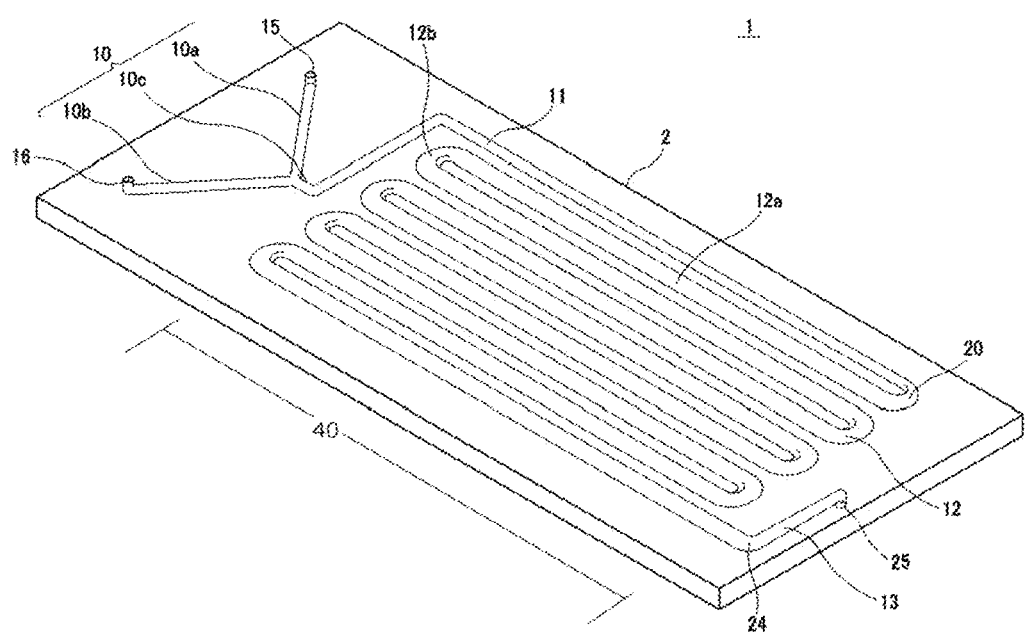
FIG. 3 is a perspective view illustrating one example of a structure of a flat plate-shaped small reactor.

As illustrated in FIG. 3, the reaction channel 12, which is a small-diameter channel, through which a liquid sample or reaction gas passes, is provided within the rectangular inorganic transparent substrate 2 in the small reactor 1. As light, such as ultraviolet rays, is applied from one side, a chemical reaction is induced at a gas-liquid interface, or a liquid-liquid interface.

In order to secure a length of the reaction channel 12 required for a reaction, a plurality of straight portions 12a, which advance in a length direction of the inorganic transparent substrate 2 are each horizontally formed over a width direction of the inorganic transparent substrate 2, and the straight portions 12a adjacent to each other are connected with a curve portion 12b. As a result of this, the reaction channel 12 is formed to meander through the entire surface of the inorganic transparent substrate 2.

As for the reaction channel 12, moreover, the straight portions 12a and the curve portions 12b may be both formed to have the identical depth and the identical width. This configuration enables to suppress a variation in pressure, and stable transportation of samples without disturbing slag alternately formed with the supplied samples. Specifically, a long section of a straight portion where the pressure is not varied can be secured by providing the straight portion 12a of the reaction channel 12 is provided along the length direction of the inorganic transparent substrate 2, and a travelling direction of the slag can be curved, and changed without varying the pressure by forming the curved portion 12b to have the width identical to that of the straight portion 12a.

As for a size of the reaction channel, a width thereof is preferably 0.1 mm to 1.0 mm, more preferably around 0.5 mm, and a depth thereof is preferably 0.1 mm to 1.0 mm, more preferably around 0.3 mm. As for a length of the reaction channel, a length of the reaction channel formed in one plain of the inorganic transparent substrate (in other words, within one plain relative to a thickness direction of the inorganic transparent substrate) is preferably 1 m to 5 m, more preferably around 2.4 m.

<<Chemical Reaction>>

Examples of the chemical reaction performed using the small reactor of the present invention include a photo-oxidation reaction, and a photopolymerization reaction.

Reaction examples are explained separately through a gas-liquid reaction using liquid and gas samples, and a liquid-liquid reaction using liquid samples.

[Gas-Liquid Reaction]

Examples of a gas-liquid reaction using the small reactor 1 include a photo-oxidation reaction of a methyl group of an aromatic ring. The photo-oxidation reaction is a gas-liquid reaction, where 4-tert-butyl toluene and oxygen are allowed to react in the presence of LiBr in the catalytic amount upon application of ultraviolet rays, to thereby synthesize 4-tert-butyl benzoic acid, in which a methyl group on an aromatic ring is oxidized.

[Liquid-Liquid Reaction]

Moreover, the small reactor 1 may be used for a liquid-liquid reaction where liquids each having different characteristics, such as a combination of a water base and an oil base, forms a slag flow, as they are not miscible.

Examples of the liquid-liquid reaction using the small reactor 1 include a photo-oxidation reaction where oxygen water and liquid sample such as organic ester.

Another example of the liquid-liquid reaction is a photopolymerization reaction between each acrylic monomer and a photopolymerization initiator contained in an aqueous liquid sample.

Moreover, in the same system, for example, it can be applied for an emulsification reaction through photopolymerization between an aqueous solution containing a polymerization initiator, and a liquid sample containing a surfactant and a monomer that is difficult to dissolve in the aqueous solution.

A type of light applied for each reaction is appropriately selected depending on the reaction, and either ultraviolet rays or visible light can be preferably used for the small reactor of the present invention.

One end of the reaction channel is connected to a supply channel, and the other end of the reaction channel is connected to a discharge channel.

<<Supply Channel>>

The supply channel is a channel configured to supply samples to be reacted in the reaction channel.

In FIG. 3, for example, the supply channel 10 contains a first supply channel 10a configured to supply a first sample, a second supply channel 10b configured to supply a second sample, and a combined channel 10c at which the first and second supply channels 10a, 10b are combined, and the supply channel 10 is formed into a substantially Y-shape. The first and second supply channels 10a, 10b are respectively exposed to the outside through openings 15, 16 formed on an upper surface of the inorganic transparent substrate 2. Moreover, the combined channel 10c is linked to the reaction channel 12.

The first supply channel 10a is linked to a syringe, which is configured to inject a first sample through the opening 15, and the first sample is injected into the combined channel 10c at the predetermined pressure according to the operation of the syringe. The second supply channel 10b is linked to a syringe, which is configured to inject a second sample through the opening 16, and the second sample is intermittently injected into the combined channel 10c at the predetermined pressure according to the operation of the syringe. The supply channel 10 is configured to alternately supply the first sample and the second sample continuously, by intermittently injecting the second sample into the first sample flown in the combined channel 10c.

The first supply channel 10a, the second supply channel 10b, and the combined channel 10c may be formed to have the identical depth, and the identical width. For example, they are formed in the size of 0.3 mm in depth, and 0.3 mm in width.

<<Discharge Channel>>

The discharge channel is a channel for discharging a reaction product from the reaction channel. One end of the discharge channel is connected to the reaction channel 12, and the other end of the discharge cannel, which is at the opposite side of the aforementioned one end, is exposed to the outside through the opening formed at the bottom surface of the inorganic transparent substrate 2. In FIG. 3, a bend portion 24 and an opening 25 are formed.

As for a more preferred embodiment of the small reactor of the present invention, there is a small reactor (see FIG. 4) having a structure where a slag forming channel 11, which has the narrower width than that of the reaction channel, is provided between the supply channel 10 and the reaction channel 12, and the channel width is gradually widened from the slag forming channel to the reaction channel using a widening part 20.

Figure 4:
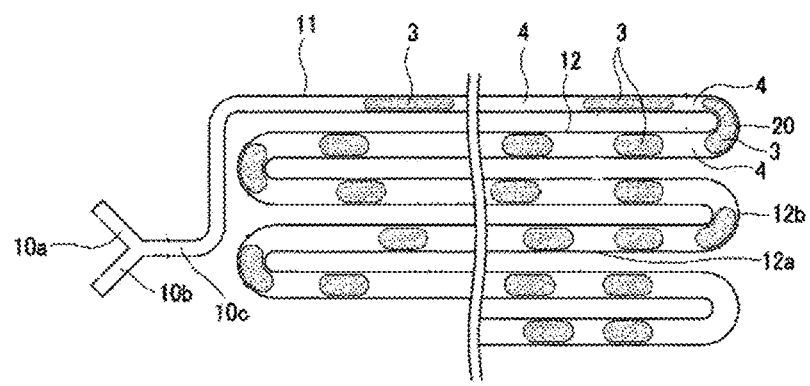
FIG. 4 is a plan view illustrating a reaction channel in a flat plate-shaped small reactor.

In FIG. 4, the liquid sample 3 and the reaction gas 4 in the small reactor are illustrated.

The aforementioned channel shape enables to supply the samples to the reaction channel in the stable state, without damaging an alternately continuous slag, which is formed by supplying the samples through the supply channel. Specifically, a significant change of the pressure can be prevented from the slag forming channel 11 to the reaction channel 12, and a shape of the slag of the narrow and long fluid sample can be changed into a thick and short shape without damaging the slag. As a result of this, a reaction efficiency is increased, and the yield of the reaction product can be improved.

<Structure of Small Reactor>

Figure 5:
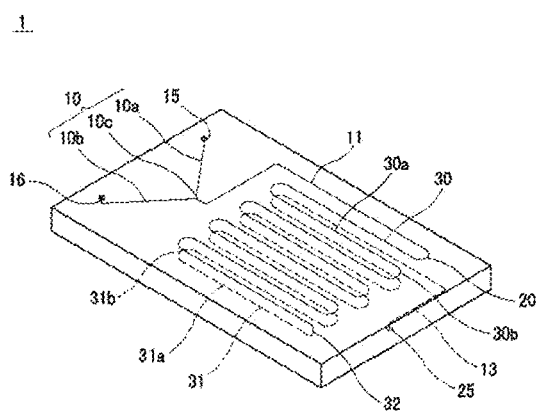
FIG. 5 is a perspective view illustrating a small reactor of a two-layer structure.

As for the small reactor of the present invention, there is a small reactor, in which the reaction channel 12 is formed in the identical plane to that of the inorganic transparent substrate 2 (in other words, in the identical layer relative to the thickness direction of the inorganic transparent substrate), as illustrated in FIG. 3. Moreover, the small reactor of the present invention may be a small reactor, in which the reaction channel 12 has a multi-layer structure over the thickness direction of the inorganic transparent substrate 2, as illustrated in FIG. 5.

<<Small Reactor of Single-Layer Structure>>

This type of the small reactor is produced by bonding a first inorganic transparent substrate, in which a groove that is to be a reaction channel is formed, and a second inorganic transparent substrate that is to be a cover layer together at joint surfaces formed on the both substrate through a production method using an optical contact method described later.

After adhering the first inorganic transparent substrate and the second inorganic transparent substrate together as a result of bonding the joint surfaces thereof together, the first inorganic transparent substrate and the second inorganic transparent substrate are chemically bonded together to thereby form the aforementioned inorganic transparent substrate as one body.

The first inorganic transparent substrate and the second inorganic transparent substrate are strongly adhered to the degree that the joint surfaces, with which both substrates are bonded, are hardly recognized, and forms the inorganic transparent substrate, as if it is a single structure (single glass plate). For example, a fluorine element is detected at the joint surfaces, which are bonded by the conventional bonding method, by an interface analysis performed by SEM. On the other hand, a fluorine element or any other element associated with bonding is not detected at the joint surfaces of the inorganic transparent substrate in the small reactor of the present invention produced in the production method described later. Moreover, the first inorganic transparent substrate and the second inorganic transparent substrate are integrated to the degree that reflection at the contact interface cannot be confirmed, even if it is tried. As described above, the parts of the small reactor of the present invention are bonded with high adhesiveness.

<<Small Reactor of Multi-Layer Structure>>

The reaction channel may have a multi-layer structure over the thickness direction of the inorganic transparent substrate.

The reaction channel may have a structure where a reaction channel of each layer is not linked to a reaction channel of another layer, and the reaction channel is independently linked to a supply channel and a discharge channel in each layer. Alternatively, the reaction channel may have a structure where a reaction channel of one layer is linked to reaction channels of other layers. In the case where the reaction channel is linked to reaction channels of other layers, an interlayer connection channel configured to connect between reaction channels of different layers may be provided.

Specifically, in the case where the reaction channel has a two-layer structure, for example, a reaction channel 30 of an upper layer, a reaction channel 31 of a lower layer, and an interlayer connection channel 32 configured to linking the reaction channels 30, 31 of the upper and lower layers are formed in the inorganic transparent substrate 2, as illustrated in FIG. 5. Similarly to the aforementioned reaction channel 12, within the reaction channels 30, 31 of the upper layer and the lower layer, a plurality of straight portions 30a, 31a, which advance in a length direction of the inorganic transparent substrate 2 are each horizontally formed over a width direction of the inorganic transparent substrate 2, and the straight portions 30a, 31a adjacent to each other are connected with a curve portion 30b or 31b. As a result of this, the reaction channel 30 or 31 is formed to minder through the entire surface of the inorganic transparent substrate 2.

Similarly to the aforementioned reaction channel 12, the reaction channel 30 of the upper layer is meandered through within the plane of the upper layer of the inorganic transparent substrate 2, and the terminal thereof, which is an opposite relative to the width direction of the inorganic transparent substrate 2, is linked to the reaction channel 31 of the lower layer via the interlayer connection channel 32. One end of the reaction channel 31 of the lower layer is linked to the interlayer connection channel 32, the rest of it is meandered through within the plane of the lower layer of the inorganic transparent substrate 2, and the terminal thereof, which is at the other end of the reaction channel 31 relative to the width direction of the inorganic transparent substrate 2, is linked to the discharge channel 13.

It is more preferred that the reaction channels 30, 31 of the upper layer and lower layer be formed in the manner that the straight portions 30a and the straight portion 31a are not overlapped to each other, as light, such as ultraviolet rays, applied from the side of the upper surface of the inorganic transparent substrate 2 can reach the reaction channel 31 of the lower layer without being blocked with the reaction channel 30 of the upper layer.

The reaction channel formed into the multi-layer structure as described above is preferable, because the length of the channel, in which a gas-liquid reaction or a liquid-liquid reaction is carried out, is prolonged, and a reaction efficiency and yield can be improved within the limited substrate space.

Similarly, to the small reactor of a single-layer structure, the small reactor of the multi-layer structure can be also produced by the production method described later. The small reactor of the multi-layer structure can be produced by laminating a plurality of inorganic transparent substrate, in each of which a groove that is to be a reaction channel is formed, and an inorganic transparent substrate, which is provided at the uppermost layer, and functions as a cover layer, to form a desired laminate state, and bonding joint surfaces thereof, each of which is formed on a surface of each substrate at the side where the adjacent substrate is provided.

Moreover, it is not necessary that all of the reaction channels in the multi-layered structure do have the same structure, and they may have different structures with varying conditions, such as a shape, among the layers.

For example, a heat medium may be introduced into at least layer of the reaction channel, which is different from the reaction channels to which samples provided to a gas-liquid reaction or a liquid-liquid reaction are provided, using the small reactor of a multi-layer structure, where the reaction channel is not linked to the reaction channel of other layer. By introducing the heat medium, a heating function or cooling function can be imparted to the small reactor. When the reaction channel has the multi-layer structure, as described above, the reaction channel can be used for a different purpose other than typical usage for a chemical reaction.

When the reaction channel is formed into a multi-layer structure, inorganic transparent substrates of two or more different materials may be laminated to form the aforementioned inorganic transparent substrate. The inorganic transparent substrate is preferably a glass substrate, as described later. In the case where a small reactor of a multi-layer structure is formed by laminating inorganic transparent substrates, two or more different types of glass substrates are used, and these glass substrates may be laminated.

<Inorganic Transparent Substrate>

A size of the inorganic transparent substrate is appropriately selected depending on the intended purpose without any limitation. For example, the size thereof may be about 2 cm to 10 cm×2 cm to 10 cm in length and width (length×width), and 1 mm to 10 mm in length.

The inorganic transparent substrate is preferably a glass substrate. Examples of the glass include quartz glass (high silica glass), borosilicate glass, soda glass (soda-lime glass), such as float glass, and lead glass.

In the case where the small reactor contains a reaction channel of a multi-layer structure, as described earlier, inorganic transparent substrates, which are different types of glass, may be laminated to produce an inorganic transparent substrate.

<Production Method of Small Reactor>

The small reactor of the present invention can be obtained by, at first, joining one inorganic transparent substrate and another inorganic transparent substrate using an optical contact method to produce a flat plate-shaped small reactor, and curving the small reactor into an arc shape using a mold.

The optical contact method is a method where joint surfaces of both two inorganic transparent substrates are polished highly precisely, and the joint surfaces are bonded at atomic level by pressing the inorganic transparent substrates with pressing, and heating.

The inorganic transparent substrate is formed by bonding two inorganic transparent substrate, in each of which a reaction channel has been formed, through an optical contact method, or by bonding an inorganic transparent substrate, in which a reaction channel has been formed, with an inorganic transparent substrate to be a cover layer.

The formation of the reaction channel is performed by etching using a chemical liquid or reactive gas, or mechanical processing using ultrafine processing, such as drilling, and partial grinding.

Moreover, the smoothing of the joint surface is performed by using a chemical that changes a surface of a polishing target together with a polishing agent, other than using a polishing agent, such as cerium oxide, buffing agent, and a surfactant.

Subsequently, the surface-treated joint surface is washed with pure water.

In this state, a pure-water film is formed on the joint surface of each inorganic transparent substrate. Therefore, each inorganic transparent substrate is rotated to shake the pure-water film off and remove with a centrifugal force caused by the rotations.

The pure-water film on each inorganic transparent substrate is removed, but water molecules are adsorbed on the joint surface just after the shaking off and removing, as the pure-water film is not removed due to evaporation caused by heating. If the joint surfaces of the inorganic transparent substrates are brought into contact with each other and laminated in this state, the inorganic transparent substrates are bonded to each other owing to hydrogen bonding via the water molecules.

When the inorganic transparent substrates are heated to the range of 500° C. to 1,000° C. (about 600° C. in this case) in the state where the inorganic transparent substrates are bonded to each other with the hydrogen bonding, the hydrogen bonding is changed to a chemical bond via oxygen. Therefore, the joint surfaces being in contact with other are chemically bonded with oxygen and fixed, to thereby obtain a flat plate-shaped small reactor.

Since the inorganic transparent substrates are bonded without using an adhesive, any impurity generated from an adhesive is not included in a reaction system of the small reactor, and a chemical reaction can be performed at high temperature, i.e., 300° C. or higher.

Subsequently, the flat plate-shaped small reactor is curved into an arc shape using a mold. In this method, an article that is to be a mold is shaped into a convex or concave shape, the flat plate-shaped small reactor is placed on the mold, and is then heated to temperature around a softening point of the flat plate-shaped small reactor, to model the flat plate-shaped small reactor after the mold. Note that, the mold needs to be formed of a material that can resist the heat when it is heated at the temperature around the softening point of the small reactor.

Figure 6A:
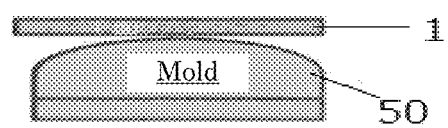
FIG. 6A is a schematic diagram for explaining one example of a process for producing a curved small reactor.
Figure 6B:
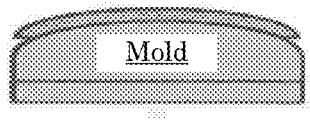
FIG. 6B is a schematic diagram for explaining one example of a process for producing a curved small reactor.
Figure 6C:
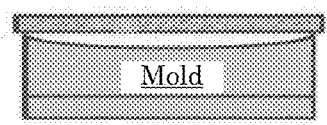
FIG. 6C is a schematic diagram for explaining one example of a process for producing a curved small reactor.
Figure 6D:
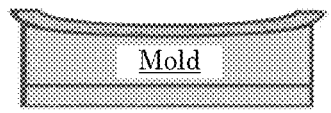
FIG. 6D is a schematic diagram for explaining one example of a process for producing a curved small reactor.

The state where the flat plate-shaped small reactor is placed on the mold, and is heated to model the flat plate-shaped small reactor after the mold is illustrated in FIGS. 6A to 6D. The flat plate-shaped small reactor 1 is placed on the convex mold 50 (FIG. 6A), and is then heated to thereby obtain an arc-shaped small reactor modeled after the convex mold (FIG. 6B). Alternatively, the flat plate-shaped small reactor is placed on the concave mold (FIG. 6C), and is then heated to thereby obtain an arc-shaped small reactor modeled after the concave mold (FIG. 6D).

The curvature of the mold may be 15 mm to 35 mm in radius. A type of the mold is appropriately selected depending on the intended purpose without any limitation, and examples thereof include those formed of any of materials that are hardly wet, such as alumina, copper, and glass.

The heating temperature at the time of curving is 700° C. to 800° C.

Figure 1:
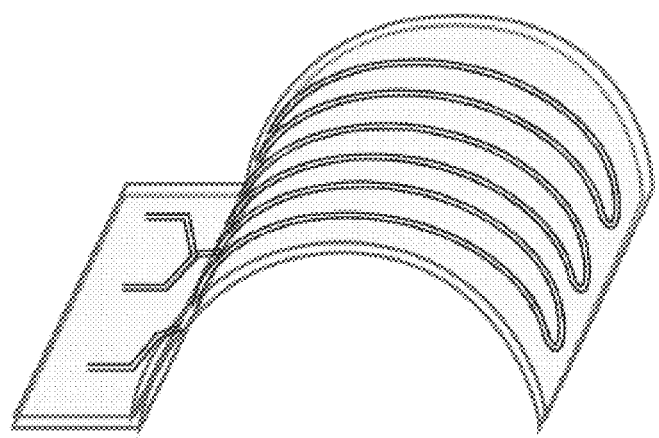
FIG. 1 is a perspective view illustrating one example of a structure of the small reactor of the present invention.

A schematic diagram of the small reactor in the shape of the arc-shaped curve obtained by curving the flat plate-shaped small reactor illustrated in FIG. 3 through the aforementioned production method is illustrated in FIG. 1.

<<Curved Shape>>

In the present invention, the curved shape of the inorganic transparent substrate is preferably an arc shape. Note that, the shape of the inorganic transparent substrate is not limited to a circular, or substantially circular arc shape, depending on the conditions, such as a positional relationship between the light source and the small reactor in the reaction device of the present invention, and a shape of the light source. The arc shape for use in the present invention includes an arc shape of an oval, and an arched arc shape, as long as the irradiation intensity at each channel in the reaction channel becomes equal.

In the present invention, a region where the inorganic transparent substrate is curved may be the entire inorganic transparent substrate, or part of the inorganic transparent substrate. The curving process is performed at least on the reaction channel region (for example, the region of 40 in FIG. 3) where the reaction channel is formed.

Since an optical contact method, which enables strong adhesion without generating air bubble, is used for adhesion to obtain the flat plate-shaped small reactor, it has been found that the small reactor is not affected by heating such the small reactor at the aforementioned high temperature and curving the small reactor.

This is because the present inventors have found the preferred conditions of the curving process, which can form a small reactor having an excellent curve without deforming the reaction channel, with considering the conditions of the optical contact method.

(Reaction Device)

The reaction device of the present invention contains the small reactor of the present invention.

A preferred embodiment of the reaction device of the present invention is a reaction device, which contains a plurality of small reactors, reaction channels of which are connected, and at least one of the small reactors is the aforementioned small reactor of the present invention.

Specifically, the reaction device of the present invention may be a reaction device, where a plurality of small reactors each in the shape of arc-shaped curve are connected, or a reaction device, where a small reactor in the shape of an arc-shaped curve, and a flat plate-shaped small reactor are combined.

As for another preferred embodiment of the reaction device of the present invention, moreover, there is a reaction device, which contains the aforementioned small reactor of the present invention, and a light source, which is configured to apply light to progress a chemical reaction in the reaction channel.

<Light Source>

A type of the light source for use is appropriately selected depending on the intended purpose without any limitation, and examples thereof include a mercury lamp, a sodium lamp, and a LED lamp.

A shape of the light source may be a spherical shape, or a cylindrical shape.

Figure 2:
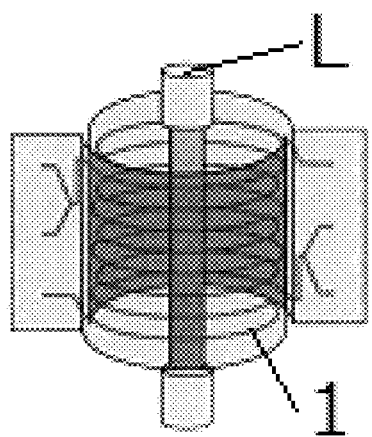
FIG. 2 is a perspective view illustrating one example of a structure of the reaction device of the present invention.

In the case where the light source is a cylindrical light source as illustrated in FIG. 2, for example, as for a size of the light source, a length thereof is preferably 5 cm to 12 cm, and more preferably around 10 cm.

<Arrangement>

The light source may be arranged at the concave surface side of the inorganic transparent substrate of the small reactor.

Figure 7:
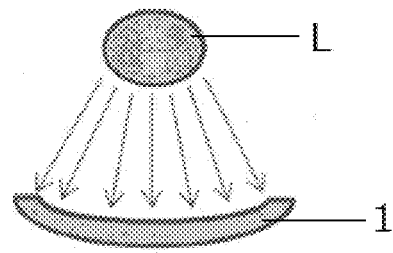
FIG. 7 is a schematic diagram for explaining a positional relationship between a light source and the small reactor in the reaction device of the present invention.

The small reactor may be provided in a manner that the reaction channel is placed at a position where an arc is formed on a circumference with the light source being a center. As a result of this arrangement, distances between the light source L and channel points in the reaction channel in the small reactor 1 become equal as illustrated in FIG. 7. Specifically, the irradiation intensity is equal at each channel point, and thus a photochemical reaction can be performed stably and efficiently.

According to the research conducted by the present inventors, a chemical reaction using the small reactor gives a difference in yield by 10%, when a distance where ultraviolet rays are applied is different by 0.1 mm. When the reaction device of the present invention is used, a stabilization and high efficiency of a photochemical reaction can be achieved at low cost and with the device of a simple structure.

As for the reaction device of the present invention, for example, there is a reaction device, which uses two small reactors illustrated in FIG. 1, and these two small reactors are arranged on a circumference of a cylindrical light source, as illustrated in FIG. 2.

In the reaction device of the present invention, moreover, an optical lens having a converge function may be provided at a surface of the small reactor, which is at a side where the light source is provided.

In the reaction device of the present invention, furthermore, a light reflective plate having high reflectance, such as aluminium, and silver, may be provided at a surface of the small reactor, which is an opposite side to the side where the light source is provided.

As a result of this, an efficiency of light utilization is further improved.

EXAMPLES

The present invention is more specifically explained through examples hereinafter, but these examples shall not be construed as to limit the scope of the present invention.

Example 1

Two glass substrates (TEMPAX GLASS (manufactured by Schott AG)) each in the size of 7 cm×5 cm (length× width), and in the height of 1 mm were provided.

A groove, which would be a reaction channel, was formed on one of the glass substrate by ultrasonic drill processing. The size of the groove was 0.5 mm in depth, 0.3 mm in width, and 2.4 m in length.

Thereafter, joint surfaces, with which both substrates were joined, were super-polished (double-sided polish using non-woven cloth and cerium oxide), and the two glass substrates were joined by the aforementioned optical contact method, to thereby obtain a flat plate-shaped small reactor.

Subsequently, the flat plate-shaped small reactor was placed on a convex-shaped aluminium mold having the curvature of 55 mm, and was heated to 800° C. at the rate of 2° C./min.

The heating was stopped when the small reactor started to deform, and the small reactor was left in this state for 30 minutes. As a result of this, the small reactor was modeled after the shape of the mold. The small reactor was then left to stand to cool to room temperature.

Figure 8A:
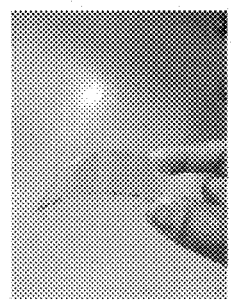
FIG. 8A is a photograph depicting one example of the small reactor of the present invention.

As a result, a small reactor in the shape of an arc-shaped curve was formed (FIG. 8A).

Samples were introduced into this small reactor, and it was confirmed that the reaction channel was connected smoothly.

Example 2

A flat plate-shaped small reactor was obtained in the same manner as in Example 1.

Subsequently, the flat plate-shaped small reactor was placed on an aluminium mold, which had been formed to give a desired shape, and had the curvature of 15 mm (radius), and was heated to 800° C. at the rate of 2° C./min.

The heating was stopped when the small reactor started to deform, and the small reactor was left in this state for 30 minutes. As a result of this, the small reactor was modeled after the shape of the mold.

The small reactor was then left to stand to cool to room temperature.

Figure 8B:
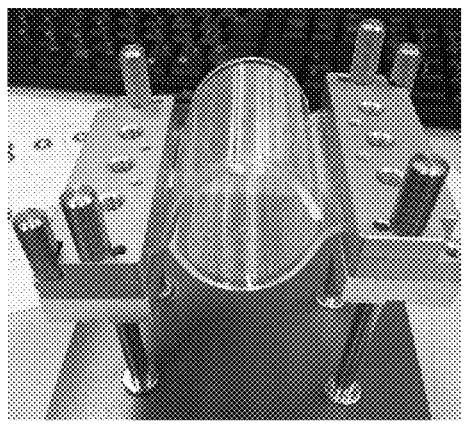
FIG. 8B is a photograph depicting another example of the small reactor of the present invention.

As a result, a small reactor in the shape of an arc-shaped curve was formed (FIG. 8B).

Samples were introduced into this small reactor, and it was confirmed that the reaction channel was connected smoothly.

Figure 9A:
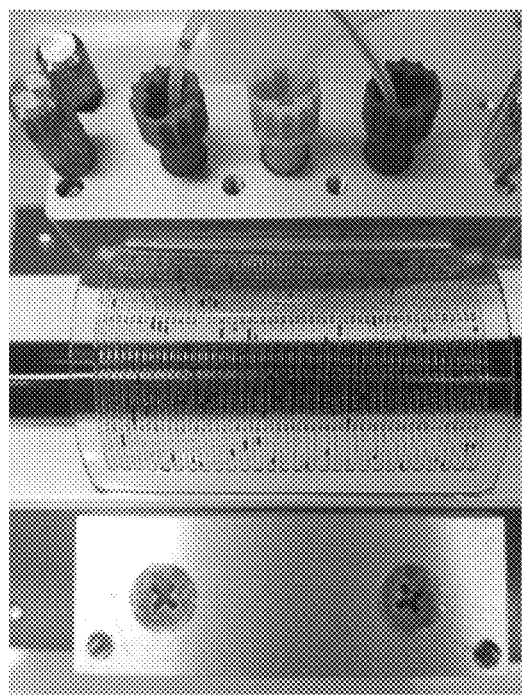
FIG. 9A is a photograph depicting a state seen from the above when the small reactor illustrated in FIG. 8B is used and a sample is introduced.
Figure 9B:
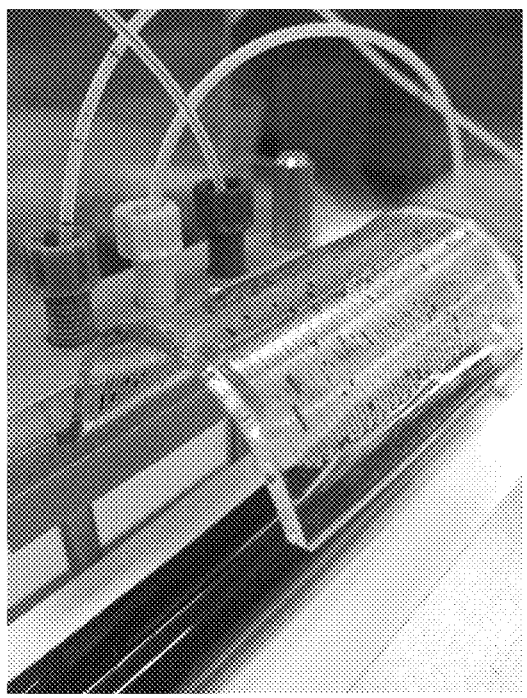
FIG. 9B is a photograph depicting a state seen from the diagonal direction when the small reactor illustrated in FIG. 8B is used and a sample is introduced.

The photographs depicting the state of the small reactor of FIG. 8B, when samples were introduced are presented in FIGS. 9A and 9B. FIG. 9A was the photograph seen from the above, and FIG. 9B was the photograph seen from the diagonal direction. In order to show that the reaction channel was connected smoothly, the gas and the liquid were alternately introduced, and the liquid was colored in blue. In FIGS. 9A and 9B, the dark colored parts appeared alternately in the reaction channel were blue liquid droplets, and the non-colored parts sandwiched with the droplets were gas. It was confirmed from the photographs that the reaction channel was smoothly connected.

As illustrated in FIG. 2, two of the above-obtained small reactors were provided on a circumference of a cylindrical light source of a high-pressure mercury lamp. Samples were introduced into the small reactors, and it was confirmed that a chemical reaction was carried out excellently.

Example 3

An effect obtained by curving the small reactor was confirmed by using the small reactor in the shape of the arc-shaped curve, which was produced in Example 2, and the flat plate-shaped small reactor before being curved.

A test was performed using a light source (4 W fluorescent lamp, manufactured by TOSHIBA Lighting & Technology Corporation) of two different wavelengths as described below, by arranging each small reactor to give a distance of about 12 mm, where the distance was distance between a centric part of the reaction channel in each small reactor to the light source.

As for the test, a gas-liquid reaction was performed and a yield thereof was confirmed. The gas-liquid reaction was synthesis of benzoic acid, which was well known as a photo-oxidation reaction. A sensitizing agent (0.12 equivalent amount) was dissolved in tert-butyl toluene, and the resultant was diluted with ethyl acetate to thereby prepare a base. The base and oxygen was introduced into a channel as a gas-liquid slag flow, and ultraviolet rays were applied to induce a reaction, to thereby synthesize tert-butyl benzoic acid.

The yield was determined by gas chromatography-mass spectrometry (GC-MS).

The results were as described below.
1) Wavelength: 254 nm
Yield of the flat plate-shaped small reactor: 1.7%
Yield of the curved small reactor of the present invention: 2.42%
2) Wavelength: 350 nm
Yield of the flat plate-shaped small reactor: 1.45%
Yield of the curved small reactor of the present invention: 1.94%

As the test was performed with the weak light source, i.e., 4 W, the value of the yield itself was low. However, the low yield could be improved by using the curved small reactor of the present invention. As illustrated with the results above, it was confirmed that the yield was improved by 0.72% (increase rate: (0.72/1.7)×100=42.4%) with the wavelength of 254 nm, and the yield was improved by 0.49% (increase rate: (0.49/1.45)×100=33.8%) with the wavelength of 350 nm by using the curved small reactor of the present invention.

Since the reaction device contains the small reactor of the present invention, the small reactor can be conform to the shape of the light source, even when a versatile light source, such as a sodium lamp, and a high pressure mercury lamp, is used as the light source, and it is not necessary to additionally provide a device for uniformly applying light. Therefore, a reaction device, which ca perform a photochemical reaction stably and efficiently at low cost with a simple structure, can be provided.

This application claims priority to Japanese application No. 2014-200567, filed on Sep. 30, 2014 and incorporated herein by reference.

What is claimed is:

1. A small reactor, comprising:
an inorganic transparent substrate, which contains:
a reaction channel configured to allow a chemical reaction to proceed therein;
a supply channel, which is connected to one end of the reaction channel, and is configured to supply samples to be reacted in the reaction channel; and
a discharge channel, which is connected to the other end of the reaction channel, and is configured to discharge a reaction product from the reaction channel,
wherein the inorganic transparent substrate is in the shape of an arc-shaped curve,
wherein the inorganic transparent substrate is composed of a first inorganic transparent substrate in a surface of which a groove to be the reaction channel is formed, and a second inorganic transparent substrate provided to the side of the surface of the first inorganic transparent substrate where the groove is formed, where the first inorganic transparent substrate and the second inorganic transparent substrate are joined with joint surfaces formed at surfaces thereof, and
wherein the inorganic transparent substrate is an inorganic transparent substrate having integral structure of the first inorganic transparent substrate and the second inorganic transparent substrate.

2. The small reactor according to claim 1, wherein the inorganic transparent substrate is a glass substrate.

3. A reaction device, comprising:
a plurality of small reactors, reaction channels of which are connected,
wherein at least one of the small reactors is the small reactor according to claim 1.

4. A reaction device, comprising:
a small reactor; and
a light source configured to apply light to allow a chemical reaction to proceed in a reaction channel,
wherein the small reactor is the small reactor according to claim 1.

5. The reaction device according to claim 4, wherein the light source is provided at a concave surface side of the inorganic transparent substrate.

6. The reaction device according to claim 5, wherein the small reactor is provided in a manner that the reaction channel is placed at a position where an arc is formed on a circumference with the light source being a center.

7. The reaction device according to claim 5, wherein an optical lens having a converge function is provided at a surface of the small reactor, which is at a side where the light source is provided.

8. The reaction device according to claim 5, wherein a light reflective plate is provided at a surface of the small reactor, which is an opposite side to the side where the light source is provided.

9. A small reactor, comprising:
an inorganic transparent substrate, which contains:
a reaction channel configured to allow a chemical reaction to proceed therein;
a supply channel, which is connected to one end of the reaction channel, and is configured to supply samples to be reacted in the reaction channel; and
a discharge channel, which is connected to the other end of the reaction channel, and is configured to discharge a reaction product from the reaction channel,
wherein the inorganic transparent substrate is in the shape of an arc-shaped curve, and
wherein the reaction channel is formed into a multi-layered structure along a thickness direction of the inorganic transparent substrate.

10. The small reactor according to claim 9, wherein the inorganic transparent substrate further contains an interlayer connection channel configured to connect the reaction channels in different layers.

11. The small reactor according to claim 9, wherein the multi-layered reaction channel has two or more structures being different from each other.

12. The small reactor according to claim 9, wherein a heating function, a cooling function, or both are imparted by introducing a heat medium into the reaction channel of at least one layer.

13. The small reactor according to claim 9, wherein the reaction channel is a multi-layered reaction channel, and the inorganic transparent substrate is formed by laminating two or more different types of glass substrates.

14. A reaction device, comprising:
a plurality of small reactors, reaction channels of which are connected,
wherein at least one of the small reactors is the small reactor according to claim 9.

15. A reaction device, comprising:
a small reactor; and
a light source configured to apply light to allow a chemical reaction to proceed in a reaction channel,
wherein the small reactor is the small reactor according to claim 9.

16. A reaction device, comprising:
a small reactor; and
a light source configured to apply light,
wherein the small reactor contains:
an inorganic transparent substrate, which contains:
the reaction channel configured to allow a chemical reaction to proceed therein;
a supply channel, which is connected to one end of the reaction channel, and is configured to supply samples to be reacted in the reaction channel; and
a discharge channel, which is connected to the other end of the reaction channel, and is configured to discharge a reaction product from the reaction channel,
wherein the inorganic transparent substrate is in the shape of an arc-shaped curve,
wherein the light source is provided at a concave surface side of the inorganic transparent substrate, and
wherein the reaction device contains:
(a) an optical lens having a converge function is provided at a surface of the small reactor, which is at a side where the light source is provided, or
(b) a light reflective plate is provided at a surface of the small reactor, which is an opposite side to the side where the light source is provided, or
both (a) and (b).

* * * * *